Sheet 1—2 Sheets.
L. Miller.
Mower.
No. 767
Reissued Jul. 19, 1859.
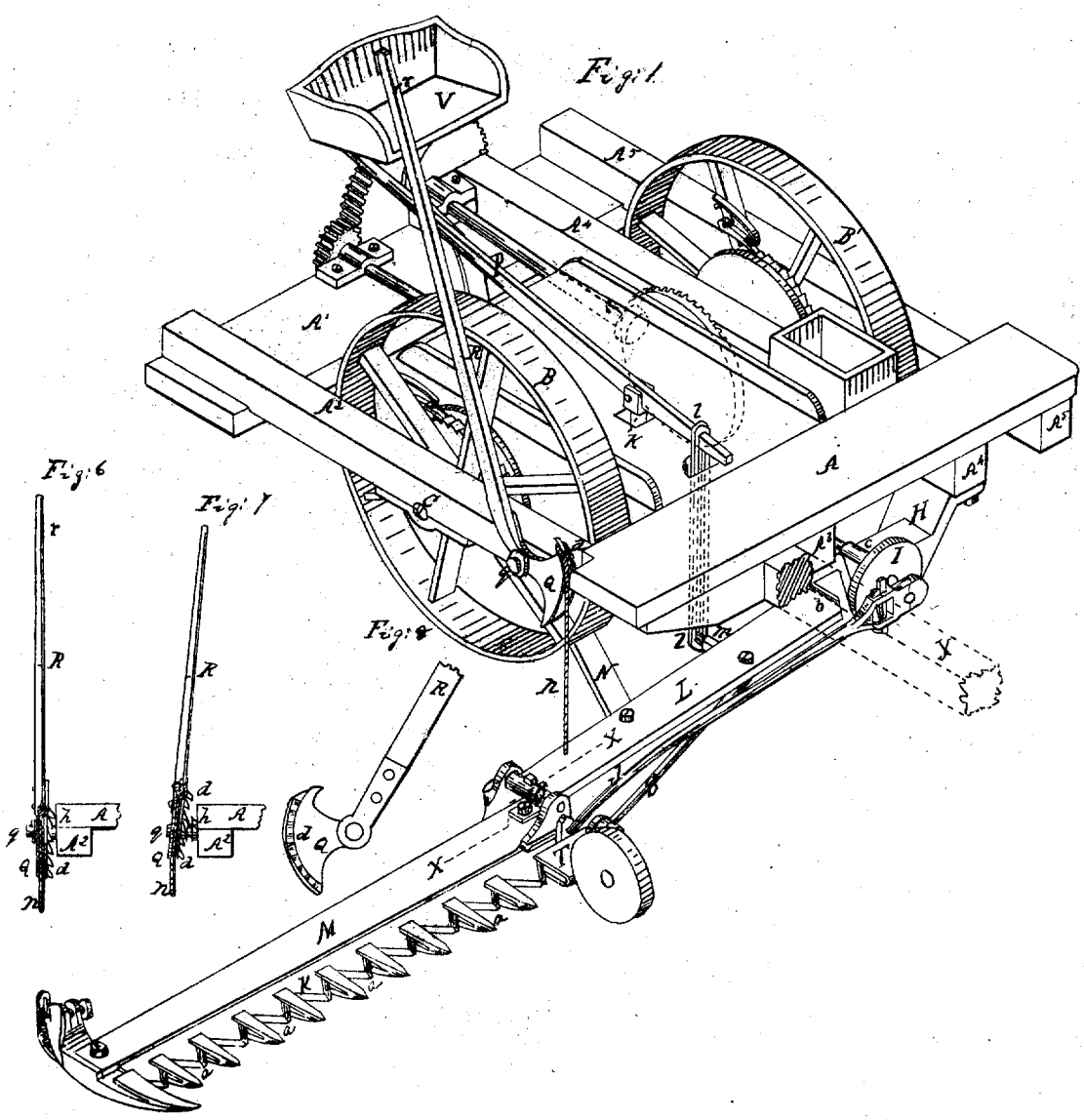

L. Miller.

Mower.

No 767 Reissued Jul. 19, 1859.

UNITED STATES PATENT OFFICE.

LEWIS MILLER, OF CANTON, OHIO, ASSIGNOR TO C. AULTMAN & CO.

IMPROVEMENT IN HARVESTERS.

Specification forming part of Letters Patent No. 20,180, dated May 4, 1858; Reissue No. 767, dated July 19, 1859.

DIVISION D.

*To all whom it may concern:*

Be it known that I, LEWIS MILLER, of Canton, in the county of Stark and State of Ohio, have invented certain new and useful Improvements in Machines for Harvesting Grain and Grass, of which the following is a full, clear, and exact description, reference being had to the accompanying drawings, which make part of this specification, and in which—

Figure 1:
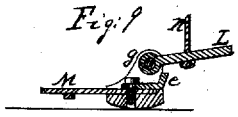
Figure 5:
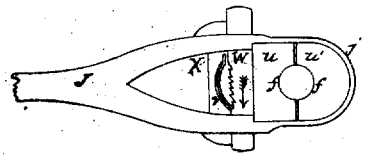
Figure 2:
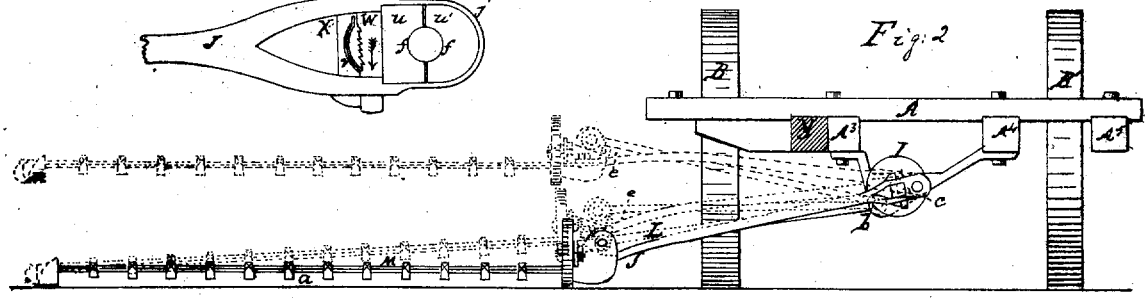
Figure 4:
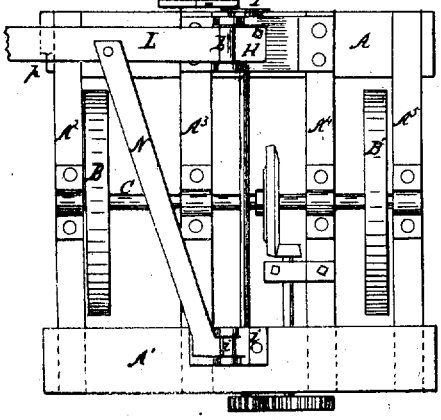
Figure 3:
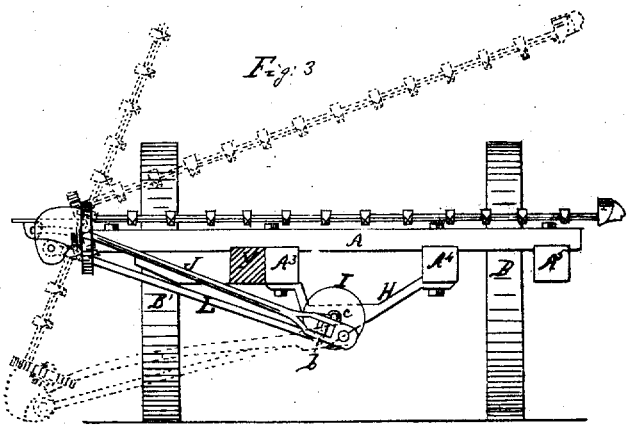

Figure 1 represents a view in perspective of the machine as arranged for mowing. Fig. 2 represents a front elevation of the machine, the black lines showing the finger-beam resting upon the ground in the position it will occupy when the machine is moving on a level surface, the red lines showing the position of the finger-beam when mowing on an uneven surface, with its left end raised to conform thereto, and the blue lines showing the finger-beam raised off and held parallel to the ground by means of a hand-lever to pass over an obstacle. Fig. 3 represents by the black lines a front elevation of the machine with the finger-beam folded over upon the frame in a compact manner. The red lines show the finger-beam raised on end preparatory to being lifted by the hand-lever and turned over upon the frame, and the blue lines show the finger-beam almost raised up and turned over upon the frame. Fig. 4 represents a view of the under side of the main frame and certain parts connected therewith, but showing more particularly the arrangement of the brace for supporting the coupling-arm. Fig. 5 represents on an enlarged scale a view of one side of a portion of the connecting-rod which transmits motion from the crank to the cutter. Fig. 6 represents a front view of the quadrant-lever for lifting and the ratchet-teeth and detent for holding up the finger-beam when raised; also, a fragment of the adjacent part of the frame detached from the machine. Fig. 7 represents a similar view of the same parts, the quadrant-lever and its ratchet-teeth being in the position they occupy when turned aside to disengage the teeth from the detent preparatory to raising or lowering the finger-beam. Fig. 8 represents a view of the side of the quadrant having the ratchet-teeth thereon; and Fig. 9 represents a vertical section at the line *x x* of Fig. 1, showing the knuckle of the joint connecting the finger-beam and coupling-arm.

That side of the machine on which the finger-beam projects when on the ground in the position shown in Fig. 1 I call the "right" side. The other I call the "left" side.

In a mowing-machine having a finger-beam which is connected to the main frame by a hinged coupling-arm, so as to admit of the finger-beam being raised from the ground and folded over upon the frame to render the machine more compact and convenient for transportation, it is difficult, by manual force alone, and even somewhat dangerous, by reason of the great weight of the finger-beam and of the sharpness of the guard-fingers and the cutter, to raise and fold them up on the frame, and it requires two persons to do it.

To enable one person to raise and fold up the finger-beam conveniently and without danger is the object of the invention claimed under this patent, which consists in combining with the folding finger-beam a lifting-lever and connecting-cord, or the equivalent thereof, to aid in raising the finger-beam and folding it upon the frame.

The accompanying drawings represent a mowing-machine having its main frame A A′ $A^2$ $A^3$ $A^4$ $A^5$, supported by an axle, C, and a pair of wheels, B and B′, and having a tongue, Y, for the horses to draw it by, which projects from the front of the frame.

The finger-beam is hinged at its left end to the right end of a coupling-arm whose left end is hinged to a bracket or hanger, H, on the under side of the main frame.

On the side of the rail $A^2$ of the frame a quadrant, Q, is supported on a pivot, *q*, and fitted with a hand-lever, R, for the purpose of turning the quadrant up and down to raise and lower the finger-beam. The front edge of the quadrant is grooved to receive and guide a cord or strap, *n*, fastened by one end to the upper corner of the quadrant and by its other end to the coupling-arm, near its right end. When the lever R is depressed the quadrant is raised and lifts the coupling-arm; and if, before lifting the coupling-arm, the finger-beam be turned upon end against the side of the frame, as shown by red lines in Fig. 3, then, when the lever is depressed and the quadrant raised, (lifting with it the end of the coupling-arm suspended by the cord,) the finger-beam will be raised bodily upward and, leaning against the frame, its own weight will carry it down to the left, so that it will gradually assume the position shown by the blue lines in Fig. 3, and finally will reach the position shown by the black lines in that figure, lying compactly, bottom upward, upon the frame. The raising of the finger-beam and folding it over upon the frame in this manner are effected with great ease by a person of ordinary skill and moderate strength. To unfold the finger-beam and again lay it upon the ground is likewise effected with great ease by simply raising up the end which lies upon the left side of the frame and allowing its right end to slide over the right side of the frame, as it tends to do, and to descend by its own weight to the ground, when the parts will again occupy the position shown by red lines in Fig. 3, and by simply turning the upper end over to the right the finger-beam will tend to descend by its own weight, and need only be lowered to the ground with moderate care to avoid the risk of injury that would attend a fall with its full weight and momentum upon some hard substance—as, for example, a stone. When lowered to the ground the finger-beam will occupy the position shown in Figs. 1 and 2.

What I claim under this patent as my invention is—

The method of folding the finger-beam upon the frame by the aid of the coupling-arm with a lifting-lever and cord, or the equivalent thereof, substantially as herein set forth.

In testimony whereof I have hereunto subscribed my name.

LEWIS MILLER.

Witnesses:
S. HAWKES,
JAS. S. TONNER.